US005632950A

United States Patent [19]

Couch et al.

[11] Patent Number: 5,632,950

[45] Date of Patent: May 27, 1997

[54] METHOD OF MAKING A LIGHT-SEALING CAP WITH FEATURE FOR ADDITION OF MATERIALS

[75] Inventors: Michael E. Couch, Rochester; William H. Mullen, Brockport; Edward J. Verdouw, Rochester, all of N.Y.

[73] Assignee: Eastman Kodak Company, Rochester, N.Y.

[21] Appl. No.: 378,038

[22] Filed: Jan. 24, 1995

Related U.S. Application Data

[62] Division of Ser. No. 107,352, Aug. 13, 1993, Pat. No. 5,402,905.

[51] Int. Cl.$^6$ .......... B29C 43/28; B29C 45/14

[52] U.S. Cl. .......... 264/274; 264/250

[58] Field of Search .......... 264/267, 268, 264/274, 275, 250, 259, 271.1; 220/367, 306; 215/309

[56] References Cited

U.S. PATENT DOCUMENTS

| | | | |
|---|---|---|---|
| 1,920,261 | 8/1933 | Lavender et al. . | |
| 3,348,744 | 10/1967 | Morin | 264/263 |
| 3,354,529 | 11/1967 | James | 264/263 |
| 3,878,962 | 4/1975 | Holbrook et al. | 215/309 |
| 4,497,765 | 2/1985 | Wilde et al. | 264/274 |
| 4,671,746 | 6/1987 | Sessody | 264/274 |
| 4,931,245 | 6/1990 | Schneider et al. | 264/274 |

FOREIGN PATENT DOCUMENTS

| | | |
|---|---|---|
| 2674038 | 9/1992 | France . |

OTHER PUBLICATIONS

Abstract—3121P93 of FR 2674038–A1.

*Primary Examiner*—Angela Ortiz
*Attorney, Agent, or Firm*—Paul A. Leipold

[57] ABSTRACT

A light-lock cap comprising a shell, means to seal said shell to a container, means to allow passage of fluids through said cap into a container covered by said cap, means to allow gases to exit a container covered by said cap, said means for liquid passage comprises a labyrinth passage with an upward facing inlet and downward facing exit, said means for gases to exit comprises a labyrinth passage with a side facing orifice on the interior of said cap and a side facing orifice on the exterior of said cap. There is also provided a method of forming the cap.

8 Claims, 3 Drawing Sheets

METHOD OF MAKING A LIGHT-SEALING CAP WITH FEATURE FOR ADDITION OF MATERIALS

This is a divisional of application Ser. No. 107,352 filed Aug. 13, 1993, now U.S. Pat. No. 5,402,905.

FIELD OF THE INVENTION

This invention relates to light-tight caps with an opening for addition of material to a container covered by the cap. It particularly relates to light-tight caps used for addition of liquid material to photographic materials.

BACKGROUND OF THE INVENTION

In preparing photographic materials for production and research it is necessary that such preparation and storage be in the dark as the materials are light sensitive. In the formation of photographic products the predominant light-sensitive material is silver halide that provides light sensitivity for image recording by the photographic products. These silver halide crystals are normally formed and stored in a gelatin solution in the dark. During the storage of such materials it is sometimes necessary to add liquids to the stored silver halide and gelatin emulsion. Therefore, there is a need for caps for containers containing silver halide emulsions to have the ability to pass liquids into and gases out of the container to facilitate treatment of the emulsions without the necessity of going into a dark area.

There is disclosed in French Patent Publication 2,674,038 (Heimroth et al.) daylight type cap containing labyrinth passages for addition of liquids with the simultaneous exit of air displaced by the addition of liquid.

PROBLEM TO BE SOLVED BY THE INVENTION

There are disadvantages with prior caps utilized for addition of materials to solutions contained in the dark. The prior caps were expensive and difficult to form. Further, the caps were difficult to clean and therefore could contaminate stored material when liquids were added through a cap contaminated with a different liquid. Further, prior caps had the difficulty that they were formed such that exiting air would be contaminated with the entering liquid and sometimes force the entering liquid out of the container with air that was being displaced.

SUMMARY OF THE INVENTION

The object of this invention is to overcome difficulties of prior light-sealing caps.

A further object is to provide a cap that is easily cleanable.

An additional object is to provide a cap that will not allow exiting air to carry added liquids out of the container.

These and other objects are generally accomplished by providing a light-lock cap comprising a shell, means to seal said shell to a container, means to allow passage of fluids through said cap into a container covered by said cap, means to allow gases to exit a container covered by said cap, said means for liquid passage comprises a labyrinth passage with an upward facing inlet and downward facing exit, said means for gases to exit comprises a labyrinth passage with a side facing orifice on the interior of said cap and a side facing orifice on the exterior of said cap.

The invention also provides a method of forming a light-lock cap comprising providing a fluid-handling insert, said insert comprising a labyrinth passage for liquids, a labyrinth passage for gases, and grooves on the outside of said insert, placing said insert into a mold, and molding a cap around said insert with the cap joining the insert at said grooves, the inlets for said labyrinth passages being on the upper surface of said cap, the outlets for said labyrinth passages being below said cap, the inlet and outlet of said gas passage are side facing, the inlet of said liquid passage is up facing and the outlet of said liquid passage is down facing.

ADVANTAGEOUS EFFECT OF THE INVENTION

The invention has the advantage that the light-tight caps are low in cost. Further, the cap of the invention minimizes the contamination of exiting air with the entering liquid materials added through the cap. A further advantage is that the caps are easy to clean and, therefore, may be reused multiple times without contamination. These and other advantages will be apparent from the detailed description below.

DETAILED DESCRIPTION OF THE INVENTION

Figure 1:
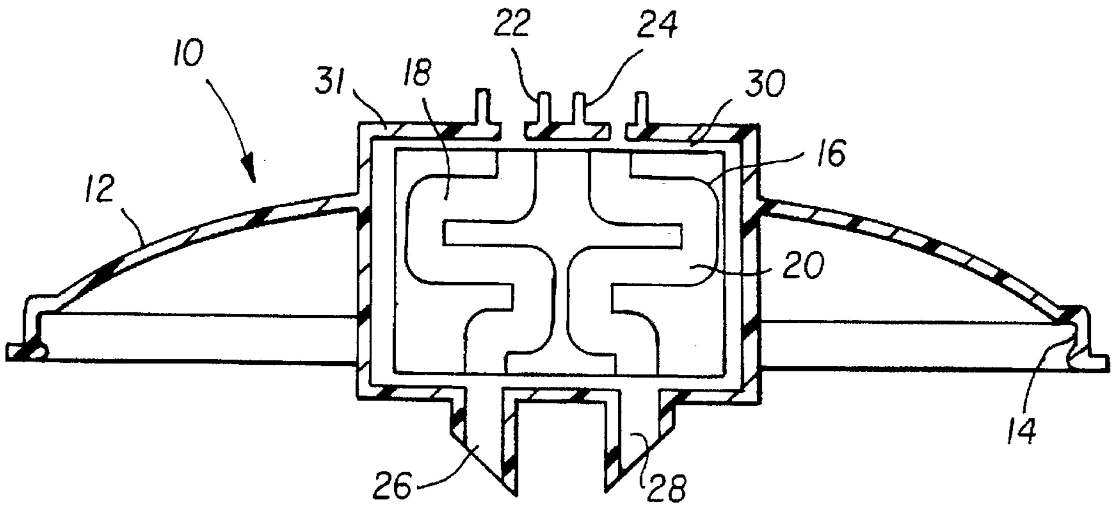
FIG. 1 (prior art)
FIG. 1 is a cross-sectional view of a cap in accordance with prior art.

FIG. 1 is an illustration of a prior art light-sealing cap. The cap is illustrated in cross-section through the portion designed for addition of fluids. The cap is comprised of an upper arcuate portion 12 that terminates at an outer edge having an indentation 14 suitable for snapping over a container, not shown. The cap encapsulates an element 16 that is provided with two passages 18 and 20. Addition of fluid and exiting of gases from the container during fluid addition. During encapsulation of insert 16 there are molded inlet openings 22 and 24 and exit openings 26 and 28. The openings 22 and 24 are adapted for insertion of a funnel for material addition. As is apparent, there is an opening 30 between the insert 16 and the encapsulating material 31 where materials intended to pass through the cap may become lodged. Materials lodged in space 30 will be difficult to remove by washing and serve as a source of continuous contamination.

Figure 2:
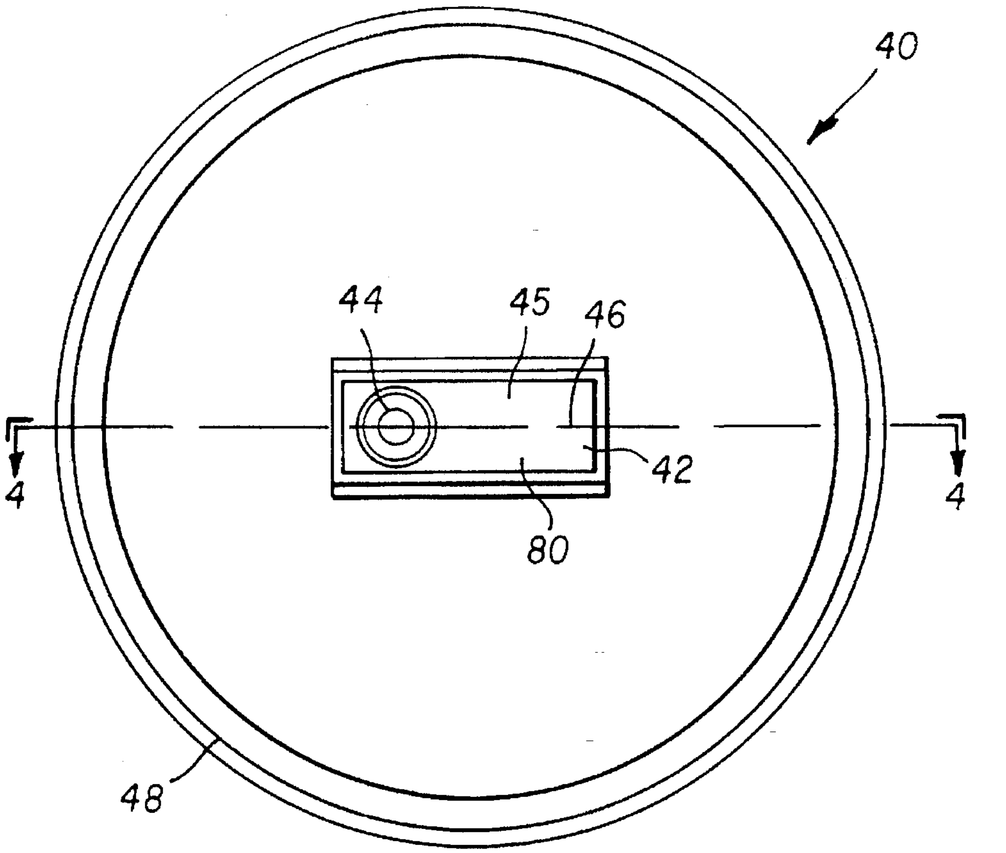
FIGS. 2, 3 and 4 are top, side and cross-sectional views of the cap in accordance with the invention.
Figure 3:
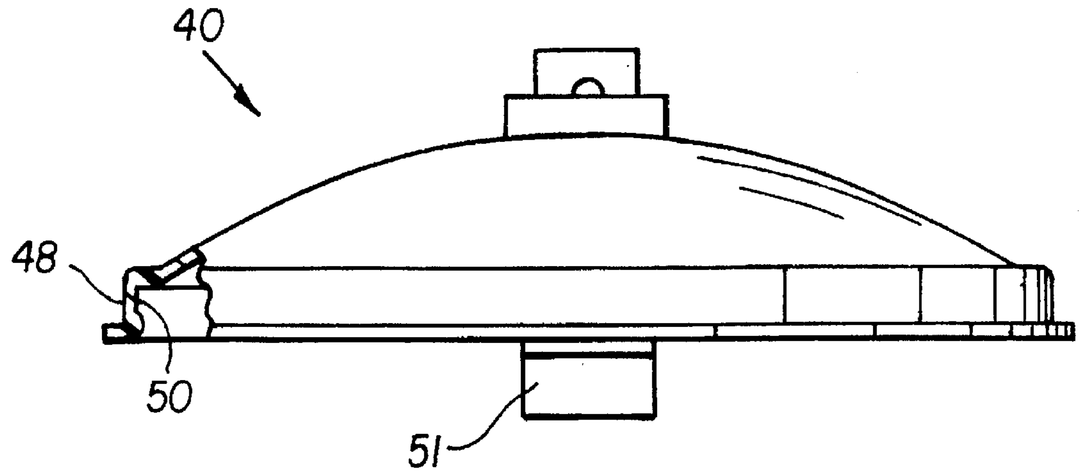
Figure 4:
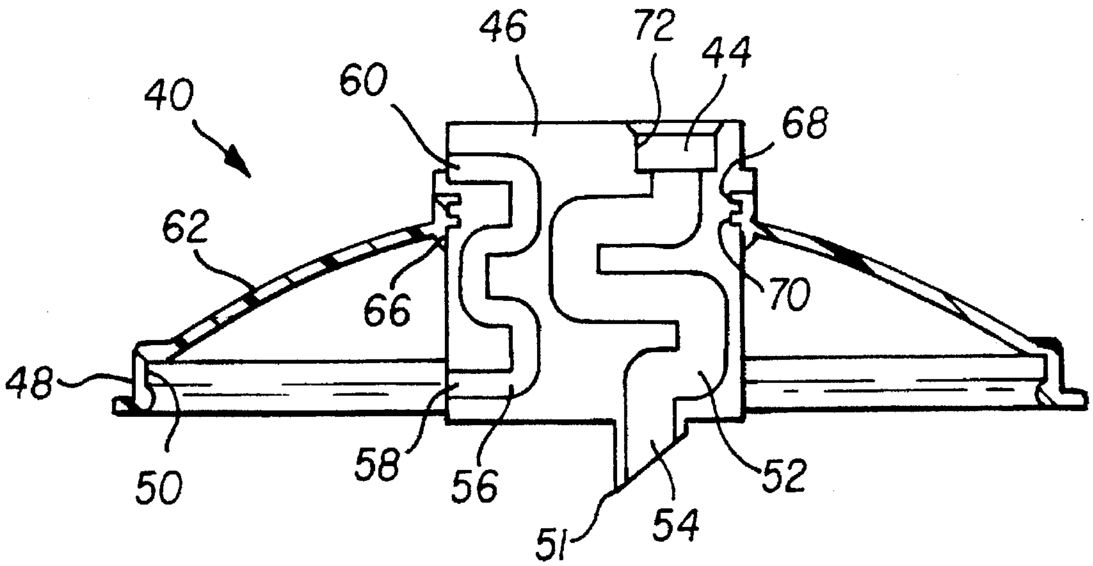

Illustrated in FIGS. 2, 3 and 4 is a cap 40 in accordance with the instant invention. FIG. 2 is a top view of the cap showing the insert 42 that is provided with the upper liquid addition orifice 44. It is noted that the fusion or joinder line 46 for the two halves 45 and 80 of the insert 42 is shown in FIG. 2. The outer edge 48 of cap 40 is provided with an indentation 50 for snapping the cap over a container, not shown. The insert 42 is provided with a downward extending portion 51 at the downward facing orifice for liquid addition.

FIG. 4 is a cross-section view on line 4—4 of FIG. 2. The insert 46 is provided with an upward opening 44 leading to a labyrinth passage 52 intended for liquid handling terminating in downward opening orifice 54. The gas exit labyrinth passage 56 is provided with a side facing orifice 58 on the lower side and an upper opening 60 at the upper side of the cap. The cap's arcuate surface 62 joining the edge 48 and the insert 46. The cap's arcuate surface 62 joins the insert 46 at area 66 which is provided with two grooves 68 and 70, respectively, where the polymer forming the surface 62 seals the insert to the rest of the cap 40 in a light-tight secure manner. Upper opening 44 is provided with an enlarged area 72 that is suitable for insertion of a funnel or cap, not shown.

Figure 5:
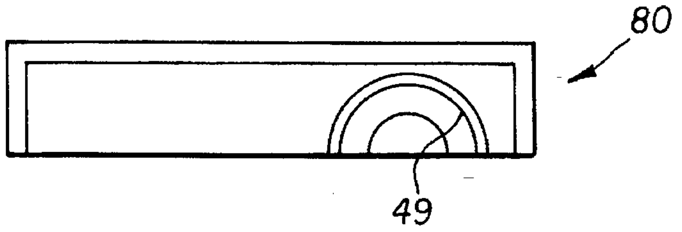
FIGS. 5, 6 and 7 are top and two side views of one-half of an insert utilized in forming the cap of the invention.
Figure 6:
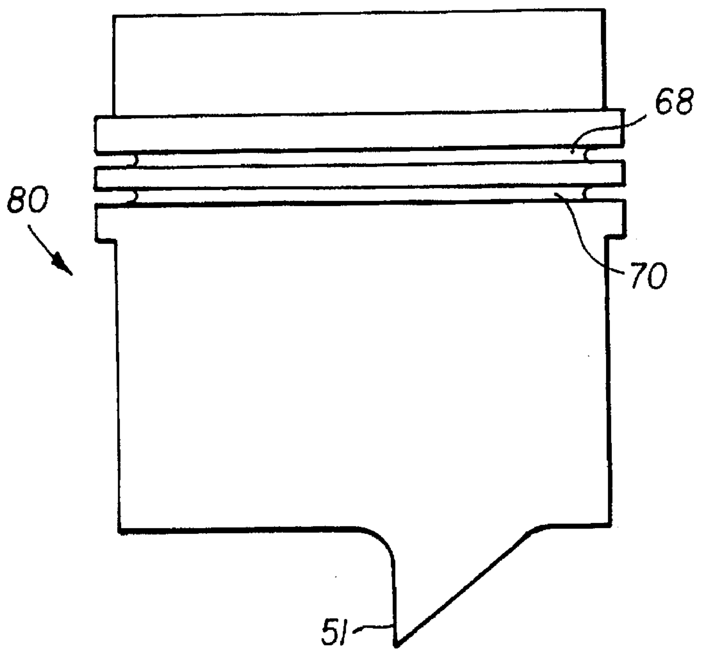
Figure 7:
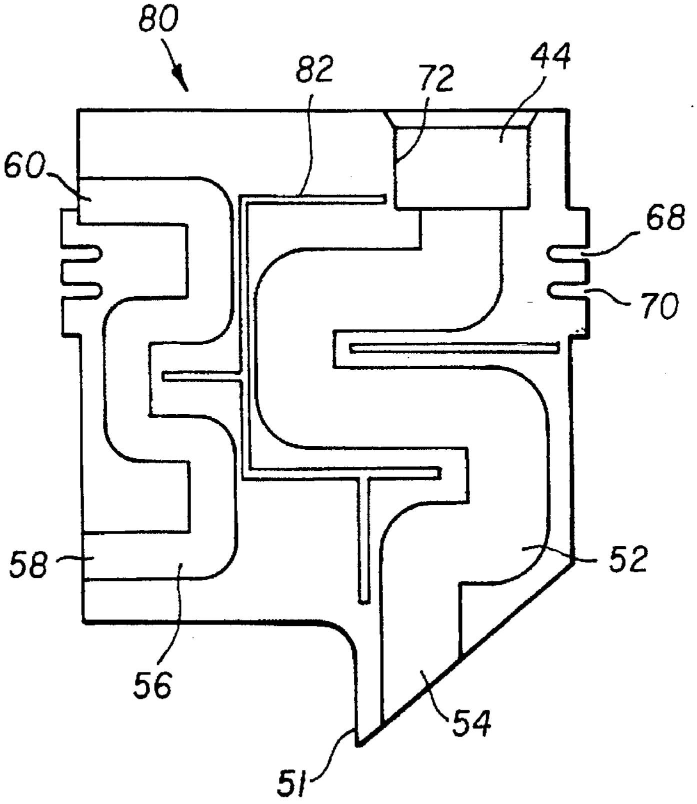

FIGS. 5, 6 and 7 illustrate one-half of the insert 46 in views from top and both sides. The half insert 80 will be joined to a mirror image half, not shown, in order to form the insert. The insert is provided with raised areas 82 that upon ultrasonic vibration al welding will join to aid in sealing the two halves of the insert together. The insert while it may be formed of any chemically inert moldable polymer material is preferably formed of a talc-loaded polypropylene for low cost and chemical inertness to the photographic materials. The polypropylene halves of insert 46 may be welded together by ultrasonic techniques as well as adhesive and gluing techniques. If welded by ultrasonic techniques, it is advisable to form the raised areas 82 to aid in welding. It is also possible to use polypropylene that is not talc loaded. The talc loading is both a cost-saving measure to reduce polypropylene use and also provides better shrinkage control.

Generally, in order to form the cap, the insert is first formed generally by separately molding the two halves and then joining them. The insert is provided with some arrangement to aid in sealing of polymer cast against it for strength and light exclusion. As illustrated, the half insert 80 has grooves 68 and 70 into which the polymer will enter. The insert 46 is placed in a suitable mold, not shown, and by known polypropylene molding techniques the remainder of the light-sealing lid is cast such that it is integrally sealed to the insert and, therefore, does not provide any areas or crevices where contamination will be protected from being easily washed away.

The light-tight caps of the invention generally incorporate an outer edge that will seal to a container on which they are placed. Typically, the caps snap onto the top of the container. However, it is within the invention to attach them by any means such as clips pressuring against elastic sealing edges or any other known sealing means which will provide a light-sealed edge.

Generally, the cap is preferred to be formed in an arcuate shape to provide strength as well as lift the lower part of the insert to an area above or about even with the top of the container which the cap seals. If the cap is molded in a flat manner, then the container may not be filled without actually contacting the liquid passage insert and interfering with the entering of additives into the container.

It is preferred that the cap and the insert be formed of the same material in order to aid in recycling of the cap after it is worn out and no longer provides sufficient sealing with a container or has been damaged in other ways. Generally, the preferred materials as above set forth are polypropylene and loaded polypropylenes, although any polymer or rubber material may be utilized.

While the cap has been illustrated with the preferred embodiments it is also within the invention to form variations and additions to the cap. It is within the invention to provide sealing means for the liquid inlet and gas outlet openings such that the material in the container covered by the cap would be less exposed to atmospheric gases and would suffer less evaporation or oxidation. Further, it is within the skill of the art to form the cap with a built-in funnel-like opening or screw connection for hose entry. Further, while the cap has been set forth as preferred for use in photographic systems it also would find use in the handling of other light-sensitive materials such as chemicals that are degraded by exposure to ultraviolet or other light rays. The cap particularly when provided with means to seal the openings also may find use in wine making and storage. Further, the cap may be formed in any color desired. However, generally, the caps are formed in black to minimize light reflection through the labyrinth passages. Further, any type of labyrinth passages may be utilized that will prevent light entering.

Generally, the labyrinth passage for liquid entry is formed with about twice the diameter of the passage for air to exit the container. This is to allow the greatest possible opening for liquid entry with the smallest possible insert. As the friction caused by gases exiting is not as great, a smaller diameter passage for gas movement may be utilized than the diameter of the passage necessary for entry of fluids.

As used herein, the terms exterior and upward facing are intended to refer to the portion of the cap that is outside of a container to which the cap is fastened. The terms downward facing and interior are intended to refer to the portion of the cap that is within the container when the cap is in place on the container. The term vertical is intended to refer to something generally perpendicular to the plane of the cap as defined by the area where the cap is sealed to a container. Side facing is intended to refer to the direction that is not upward or downward, but generally in the plane of the sealing ring for the cap.

The invention has been described in detail with particular reference to preferred embodiments thereof, but it will be understood that variations and modifications can be effected within the spirit and scope of the invention.

What is claimed is:

1. A method of forming a light-lock cap having a shell and means to seal said shell to a container, comprising:

providing a fluid-handling insert comprising means to allow passage of liquids through said cap into the container covered by said cap;

said insert comprising means for liquid passage including a labyrinth passage for liquids with an upward facing inlet and downward facing outlet, said passage for liquids contained in said fluid-handling insert, the inlet for said labyrinth passage for liquids being on an upper surface of said cap and the outlet for said labyrinth passage for liquids being on a lower surface of said cap, said insert further comprising means to allow gases to exit said container covered by said cap including a labyrinth passage for gases with a side facing inlet and side facing outlet, said passage contained in said fluid-handling insert, said labyrinth passage for gases having a side facing orifice on the interior of said cap and a side facing orifice on the exterior of said cap, said fluid-handling insert further comprising grooves on an outside of said insert, placing said insert into a mold cavity, and molding the cap around said insert with the cap joining the insert at said grooves;

wherein said cap and said insert are formed of the same polymer.

2. The method of claim 1 wherein said passage for gases to exit is about one-half of the diameter of said liquid passage.

3. The method of claim 1 wherein said upward facing inlet has a recess for receiving a funnel.

4. The method of claim 1 wherein said insert comprises a talc-loaded polypropylene.

5. The method of claim 1 wherein said downward facing exit ends in a downward facing point.

6. The method of claim 1 wherein said downward facing exit is separated from the side facing interior gas orifice by a vertical surface.

7. The method of claim 1 wherein said polymer comprises polypropylene.

8. The method of claim 1 wherein said shell is arcuate.

* * * * *